June 28, 1949. E. KLEPPEN ET AL 2,474,481
FISH LURE
Filed May 1, 1946

INVENTORS
Emil Kleppen
Ingwald B. Hansen
BY Lancaster, Allwine & Rommel
ATTORNEYS.

Patented June 28, 1949

2,474,481

UNITED STATES PATENT OFFICE 2,474,481

FISH LURE

Emil Kleppen and Ingwald B. Hansen,
Minneapolis, Minn.

Application May 1, 1946, Serial No. 666,328

1 Claim. (Cl. 43—35)

This invention relates to artificial bait or fish lures and it is one object of the invention to provide a lure having a body shaped to resemble a fish and carrying hooks which are normally housed within the body of the bait and movable to an extended position for catching a fish when the lure is taken by the fish.

Another object of the invention is to so form the body of the lure that it is hollow and provides a chamber in which the hooks are normally housed, thus preventing the hooks from being exposed and causing a fish to be scared to take the bait and also preventing the lure from becoming snagged in weeds, logs, or the like when drawn through water and causing the line to be broken and the lure lost.

Another object of the invention is to provide an artificial lure wherein the hooks are pivotally mounted about a screw shank which holds side sections of the body together, said hooks having integral side arms connected with a resilient yoke which normally holds the hooks in a retracted position and is engaged by a rod or stem to which a fishing line is connected so that when pull is exerted the yoke will be drawn forwardly and the hooks swung about the screw to an extended position.

Another object of the invention is to provide an artificial lure which has a body weighted along its under portion so that it is in the normal position of a swimming fish and is prevented from spinning when drawn forwardly through water.

Another object of the invention is to so form the lure that if the hooks become broken or damaged they may be easily removed and new ones applied.

The invention is illustrated in the accompanying drawings wherein.

Figure 1:
Fig. 1 is a side view of the improved fish lure.
Figure 2:
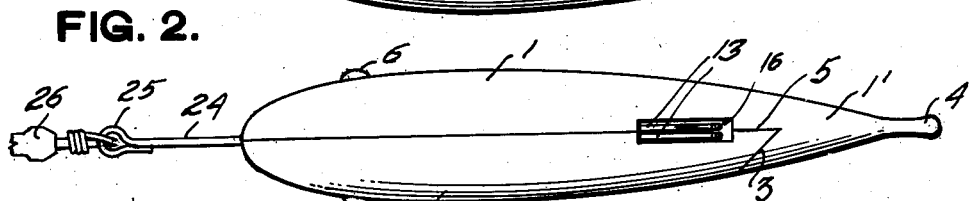
Fig. 2 is a view looking at the top of the lure.
Figure 3:
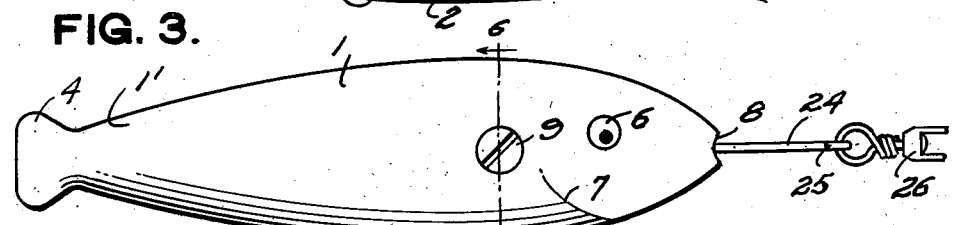
Fig. 3 is a view looking at the opposite side of the lure from that shown in Fig. 1.

This improved fish lure or artificial bait has a body which is preferably formed of wood, plastic or other suitable material, and has a main section 1, and a removable side section 2 disposed in side relation to the main section of the body. The removable section 2 is of less length than the main section and terminates in forwardly spaced relation to the rear end thereof as shown in Fig. 2. This side section 2 has its rear end bevelled so that it fits under a tongue 3 formed integral with the rear portion 1' of the main section 1 of the body which tapers towards its rear end and terminates in an enlargement forming a tail 4 for the bait. The side edge faces of the main section and the removable section of the body are flat and disposed in face to face engagement with each other and the inner face of the rear end portion of the removable section has flat face to face engagement with the flat surface 5 formed under the tongue 3 of the main section. Since the main section and the removable section of the body have their outer surfaces curved longitudinally and transversely and their meeting edges flush with each other the body will closely resemble the body of a fish constituting the normal food of fish to be caught. Eye simulations may be provided at opposite sides of the front end of the lure and marks 7 may be provided to represent gills. At its front end the body has meeting edges of its sections notched to form an opening 8 shaped to resemble the mouth of a fish. A screw 9 which is passed through an opening 10 formed transversely through the main section of the body and screwed into a socket 11 formed in the removable section 2 securely holds the removable section against the main section but permits ready removal of the section 2 when necessary. Strips or blocks of lead 12 which serve as weights are mounted in recesses formed longitudinally of lower portions of the two sections of the body midway the length thereof and serve very effectively to hold the body in the normal position of a fish and prevent the body from having spinning motion when drawn forwardly through water.

Figure 4:
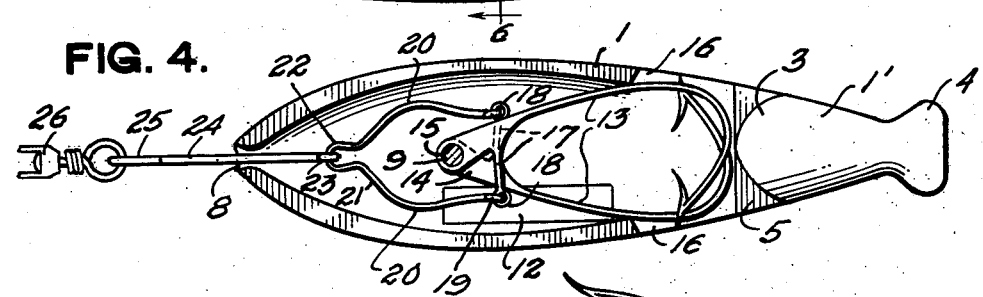
Fig. 4 is a view showing the detachable section of the body of the lure removed and showing the hooks in the normally retracted position.
Figure 5:
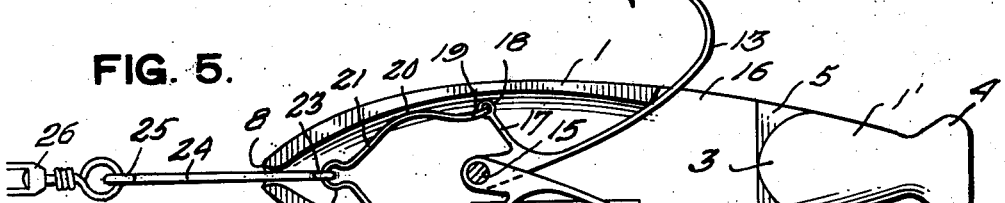
Fig. 5 is a view similar to Fig. 4 showing the hooks extended.
Figures 6, 7:
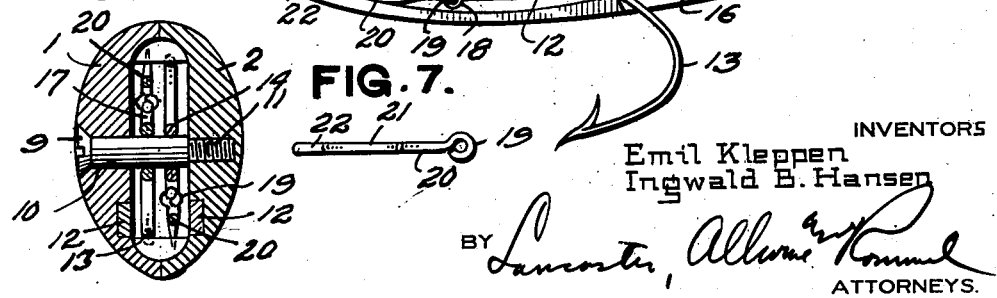
Fig. 6 is a transverse sectional view taken along line 6—6 of Fig. 3.
Fig. 7 is a side view of the resilient yoke or spring with which the hooks are connected.

Normally housed within the hollow body are hooks 13 which extend longitudinally of the body and have the forward ends of their shanks enlarged to provide heads 14 through which circular openings 15 are formed to receive the shank of screw 9 and pivotally mount the hooks for swinging movement from the retracted position shown in Fig. 4, to the extended position shown in Fig. 5. Openings 16 formed by registering recesses formed in rear portions of the side edges of the two sections 1 and 2 allow the hooks to move outwardly to the extended position for catching a fish taking the lure. Arms 17 project laterally from and integral with the outer side edges of the heads 14 and terminate in eyes 18 through which are loosely engaged eyes 19 formed at ends of the arms 20 of a yoke 21. This yoke is formed of resilient wire and at its front end is crimped to form an eye 22 through which is loosely engaged an eye 23 formed at the rear end of a rod 24. The rod 24 is formed of stiff wire and passes outwardly through the opening 8 at the front end of the body and at its front end may be formed with an eye 25 loosely engaged through a swivel 26 by means of which the bait is connected with a fishing line not shown in the drawing. Since the line is tied to the swivel the lure will not spin when drawn forwardly through water. When a fish takes the lure and pull is exerted, the rod 24 is drawn forwardly and the yoke 21 moved towards the front end of the bait. During this forward movement of the rod or link and the yoke, pull is exerted upon the arms 17 and the hooks will be swung outwardly through openings or slots 16 to the extended position shown in Fig. 5 and their bills will become embedded in the mouth of the fish taking the lure. When the fish is removed from the hooks resiliency of the yoke will return its arms to the position shown in Fig. 4 and retract the hooks. It will thus be seen that the hooks will be normally held in the retracted position and very quickly moved to the extended position when a fish takes the lure. Since the arms of the yoke are bowed longitudinally and are spread to a position in which they bear against inner surfaces of the two body sections 1 and 2 when the yoke is drawn forwardly they will have a tendency to quickly move towards each other and retract the hooks when pull upon the rod 24 ceases and the hooks are removed from a caught fish.

Having thus described the invention, what is claimed is:

An artificial bait comprising a hollow body having the shape of a fish and consisting of a main section and a removable side section, the side section being shorter than the main section and having its rear end spaced forwardly from the rear end of the main section and formed with a beveled rear end face extending its full width and fitting under a forwardly extending tongue formed integral with and extending the full width of the rear portion of the main section, said body defining an integral chamber having side walls and upper and lower edge walls and having an opening at its front end and upper and lower longitudinally extending slots adjacent the rear end of the removable side section and formed by registering recesses in meeting edge faces of the said sections, a screw passing thru an opening in the main section and screwed into a socket in the removable section to hold the said sections together, hooks extending longitudinally in the chamber of the body and having heads at front ends of their shanks formed with openings thru which said screw passes to pivotally mount the hooks for swinging movement about the screw from a retracted position within the chamber to an extended position in which their bills project outwardly thru the upper and lower slots, arms extending laterally from and rigid with the outer side edges of said heads, a U-shaped yoke of resilient wire in the forward portion of the chamber having an eye at its front end and outwardly bowed arms extending rearwardly therefrom and terminating in eyes loosely engaged thru eyes at ends of the arms of said hooks, and a rod extending thru the opening at the front end of said body and having an eye at its rear end loosely engaged with the eye of said yoke and its front end adapted for connection with a fishing line, forward pull upon said rod serving to draw the yoke forwardly and exert pull upon the arms of the hooks to swing the hooks about the screw to an extended position, and resiliency of the yoke serving to return the hooks and the rod to a normal position when pull upon the rod is released.

EMIL KLEPPEN.
INGWALD B. HANSEN.

REFERENCES CITED

The following references are of record in the file of this patent:

UNITED STATES PATENTS

| Number | Name | Date |
|---|---|---|
| 1,385,536 | Gleason | July 26, 1921 |
| 1,417,482 | Aspelin | May 30, 1922 |
| 1,638,923 | Danielson | Aug. 16, 1927 |
| 2,044,702 | Kalyu | June 16, 1936 |